United States Patent
Eiswerth et al.

(10) Patent No.: US 6,608,262 B1
(45) Date of Patent: Aug. 19, 2003

(54) AIRCRAFT LOAD CELL SHORING

(75) Inventors: Robert J. Eiswerth, Orange Park, FL (US); M. Bruce Keen, Orange Park, FL (US); Larry D. Peterson, Jacksonville, FL (US); Alan M. Saferstein, Marietta, GA (US); Rick P. Strickland, Jacksonville, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 253 days.

(21) Appl. No.: 09/908,072

(22) Filed: Jul. 17, 2001

(51) Int. Cl.$^7$ .............................. G01G 19/52; B66F 7/26
(52) U.S. Cl. ..................... 177/146; 244/54; 248/554; 254/45
(58) Field of Search ................... 254/45; 248/554–557; 244/54; 177/146

(56) References Cited

U.S. PATENT DOCUMENTS

| | | | | |
|---|---|---|---|---|
| 2,754,107 A | * | 7/1956 | Ernst et al. | 177/146 |
| 3,119,598 A | * | 1/1964 | Petersen et al. | 177/146 |
| 4,002,215 A | * | 1/1977 | Harvill | 177/146 |
| 4,137,977 A | * | 2/1979 | Alger | 177/146 |
| 4,385,527 A | * | 5/1983 | Raskin | 177/146 |
| 4,469,307 A | | 9/1984 | Bell | 254/199 |
| 4,717,094 A | | 1/1988 | Chee | 244/54 |
| 5,810,287 A | | 9/1998 | O'Boyle et al. | 244/54 |

* cited by examiner

Primary Examiner—Randy Gibson
(74) Attorney, Agent, or Firm—Mark O. Glut

(57) ABSTRACT

An aircraft load cell shoring for placing a wing with an aircraft engine attached to the wing in an unloaded condition and for use with a load cell mounted on an aircraft jack. The aircraft load cell shoring includes a load cell adapter and a shoring contour assembly. The load cell adapter is able to be disposed above the load cell. The shoring contour assembly is an assembly for supporting an aircraft engine, and has a shoring contour assembly bottom portion, and a fixed receptacle located at the shoring contour assembly bottom portion. The load cell adapter communicates with the fixed receptacle. The fixed receptacle is located such that the aircraft jack is aligned with the center of gravity of the engine and enclosed part of the wing.

14 Claims, 6 Drawing Sheets

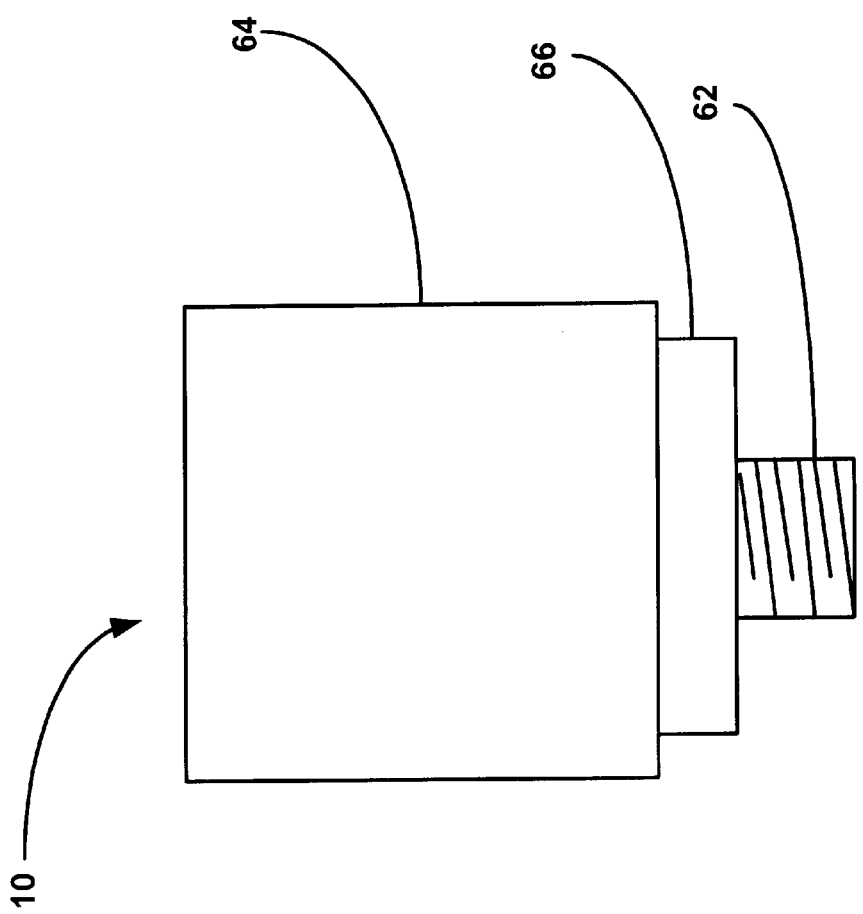

AIRCRAFT LOAD CELL SHORING

STATEMENT OF GOVERNMENT INTEREST

The invention described herein may be manufactured and used by or for the Government of the United States of America for governmental purposes without payment of any royalties thereon or therefor.

BACKGROUND

The present invention relates to an aircraft load cell shoring. More specifically, but without limitation, the present invention relates to an aircraft load cell shoring for engine-on spar cap insertions and complete replacements or wing repairs.

Aircraft often require spar (specifically aft spar cap) repair or complete replacement of the spar (or spar cap) due to major damage. A spar is typically defined, but without limitation, as one of the principal structural members in an airfoil, especially in a wing, running from tip (outer end of an airfoil, such as a propeller blade or wing) to tip or from root (base of an airfoil where it joins the body or fuselage of an aircraft) to tip. A spar cap is typically defined, but without limitation, as a continuous wing piece that runs from wing root to wing tip, and is a support structure of the wing box. The spar cap also supports air and structural loads.

To perform a spar or spar cap repair or a complete replacement, the affected wing must be in an unloaded condition. A wing in an unloaded condition is typically a condition where the wing does not bear, support, sustain or hold any pressure, encumbrances or weight. The spars and/or spar caps are typically removed by removing the fasteners that attach the spars or spar caps to the aircraft or airfoil. Any load, such as the weight of the engines on the wing or the weight of the wing itself, can cause shifting of the airfoil parts when the fasteners are removed from the spar and/or spar caps. Placing the airfoil parts back in their original locations is often difficult and time consuming. Therefore, it is very important that the wing be in an unloaded condition during repair or replacement of spars or spar caps.

Conventional methods require removal of engines to repair or replace spars, spar caps and/or wings. Removal of an aircraft engine is time consuming and expensive. Furthermore, to reinstall and rerig the aircraft engine back to its original installation is time consuming, expensive and difficult, especially in military aircraft which often have other apparatuses and systems (such as weapon, surveillance, anti-radar systems, navigation systems) working in concert and in communication with the aircraft engine.

For the foregoing reasons, there is a need for an aircraft load cell shoring that places a wing in an unloaded condition without removal of attached aircraft engine(s) and allows easy repair or replacement of spar or spar caps. Information relevant to attempts to address these problems can be found in U.S. Pat. Nos. 4,469,307, 4,717,094, and 5,810,287. (None of these patents are admitted to be prior art with respect to the present invention.) However, each of these references suffers from one of the above listed disadvantages.

SUMMARY

The present invention is directed to an aircraft load cell shoring that satisfies the needs listed above and below.

It is an object of the present invention to provide an aircraft load cell shoring for use with a load cell mounted on an aircraft jack. It is a further object of the present invention to provide an aircraft load cell shoring that includes a load cell adapter and a shoring contour assembly. The shoring contour assembly may support the aircraft engine at one, two or several specific locations. The load cell adapter is disposed above the load cell, and the load cell is mounted on the aircraft jack. The shoring contour assembly has a fixed receptacle located at the shoring contour assembly bottom portion. The load cell adapter communicates with the fixed receptacle, while the fixed receptacle is positioned so that the aircraft jack can be located at the center of gravity of the aircraft engine and enclosed portion of the wing.

It is also an object of the present invention to provide an aircraft load cell shoring that places a wing in an unloaded condition without removal of any attached aircraft engine(s).

It is another object of the present invention to provide an aircraft load cell shoring that eliminates the significant cost and time of removing and reinstalling aircraft engines for spar, spar cap, and wing insertions, replacements, or repairs.

It is an object of the present invention to provide an aircraft load cell shoring which allows quicker turn around time for removal or replacement of a spar, specifically of an aft spar cap.

It is an object of the present invention to provide an aircraft load cell shoring that has the ability to measure the force that is actually being applied with the shoring.

DRAWINGS

These and other features, aspects and advantages of the present invention will become better understood with reference to the following description and appended claims, and the accompanying drawings wherein:

FIG. 6 is a side view of the load cell adapter.

DESCRIPTION

Figure 1:
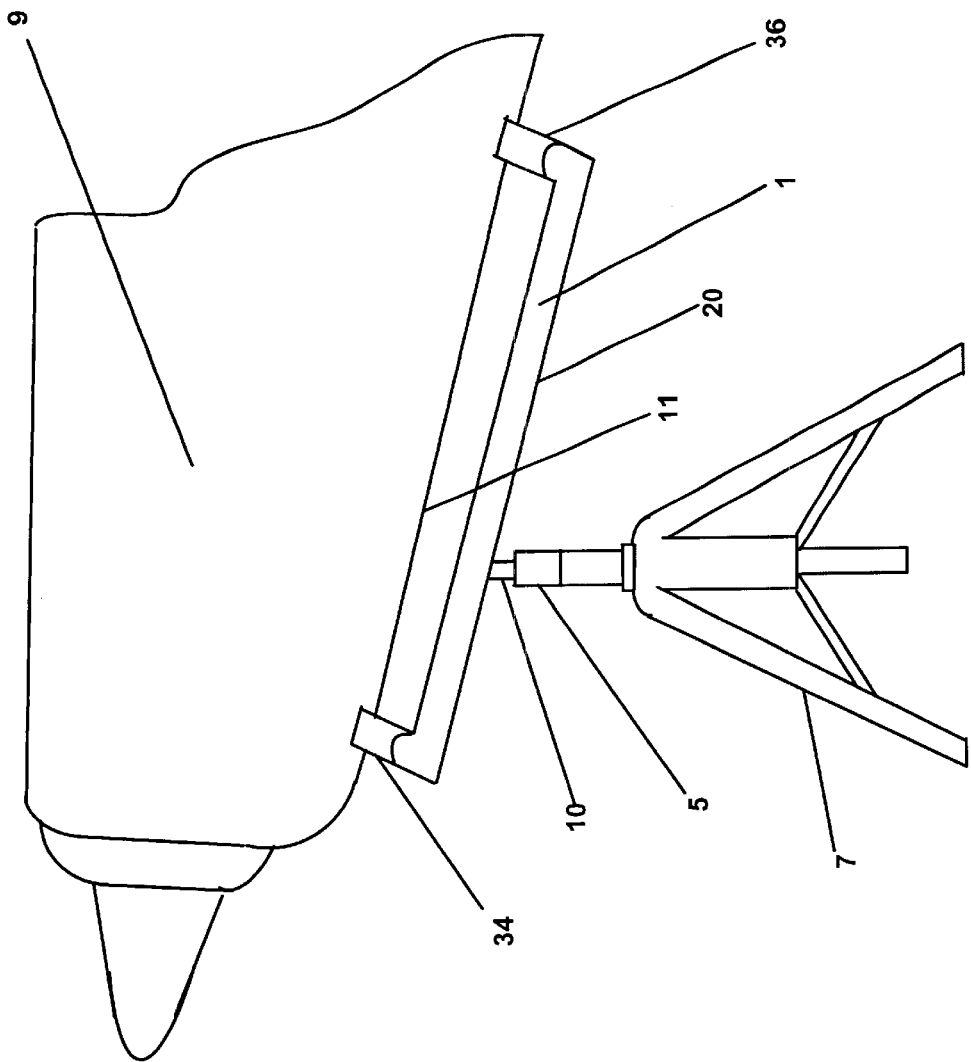
FIG. 1 is a side perspective view of the aircraft load cell shoring in use with a load cell and aircraft jack.
Figure 2:
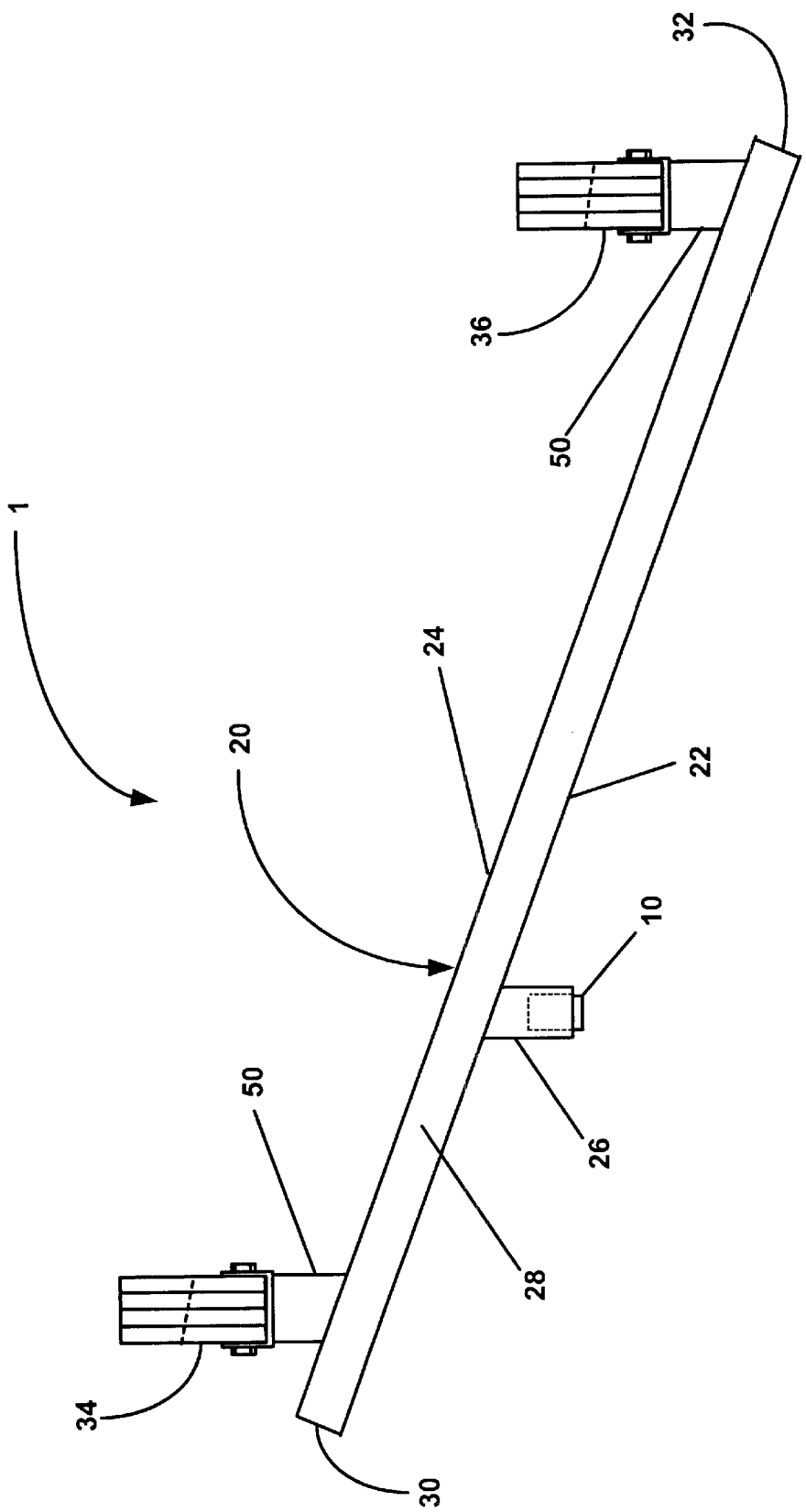
FIG. 2 is a side view of the aircraft load cell shoring.

The preferred embodiment of the present invention is illustrated by the way of example in FIGS. 1, 2, 3, 4, 5 and 6. As shown in FIGS. 1 and 2, the aircraft load cell shoring 1 includes a load cell adapter 10 and a shoring contour assembly 20. The aircraft load cell shoring 1 can be used for engine-on aft (rear) spar or spar cap insertion/complete replacement and repairs. The aircraft load cell shoring 1 is used in conjunction with a load cell 5. A load cell is typically, but without limitation, defined as an apparatus, device or system that measures the load an object is bearing, supporting or holding. A load cell may also apply to that object an equal and opposite force to the load the object is bearing. Typically the load cell 5 is mounted on an aircraft jack 7. An aircraft jack 7 is typically defined, but without limitation, as a device, a system or apparatus for lifting aircraft or aircraft parts (such as aircraft engines 9 or aircraft wings) using various mechanical, pneumatic or hydraulic methods.

The load cell adapter 10 can be disposed above the load cell 5 and can attach the load cell 5 to the shoring contour assembly 20. In the preferred embodiment, the shoring contour assembly 20 can support an aircraft engine 9 at two specific locations. In certain instances support may be only required at one location, while in other instances support may be required at more than two locations.

The shoring contour assembly 20 has a shoring contour assembly bottom portion 22, a shoring contour assembly top portion 24 and a fixed receptacle 26. The fixed receptacle 26 can be located on the shoring contour assembly bottom portion 22. The load cell adapter 10 may communicate with the fixed receptacle 26. A fixed receptacle 26 is, but without limitation, a container, an apparatus, a system or a device for receiving the load cell adapter 10 wherein the fixed receptacle 26 as well as the load cell adapter 10 is fastened, placed or attached so as to be firm, stationary, or not readily movable. The fixed receptacle 26 is located such that the aircraft jack 7 (to which the load cell 5 is attached to) will be aligned with the center of gravity of the aircraft engine 9 and nacelle (the enclosed part of the wing). The term center of gravity of the aircraft engine 9 and nacelle is typically defined, but without limitation, as the point of the aircraft engine 9 and nacelle about which all parts are balanced or the point at which the combined force (resultant) of all the weight forces in the aircraft engine 9 and nacelle are concentrated for any position of the body.

As shown in FIG. 2, the shoring contour assembly 20 may include a shoring shaft portion 28. The shoring shaft portion 28 can be in the form of a rod, a tubing, a cylinder, a wand, a stem, a slender bar, a pole, a relatively long, straight, rigid piece of material, an arm, a beam, a member, a cantilever, an arbor, or the like. The shoring shaft portion 28 may have a first shaft end 30 and a second shaft end 32. The shoring contour assembly 20 may include a first cradle assembly 34 and a second cradle assembly 36. The first cradle assembly 34 may be disposed at the first shaft end 30 of the shoring shaft portion 28, while the second cradle assembly 36 may be disposed at the second shaft end 32 of the shoring shaft portion 28. As seen in FIG. 2, in the preferred embodiment the first cradle assembly 34 and second cradle assembly 36 are located on the shoring contour assembly top portion 24.

Figure 3:
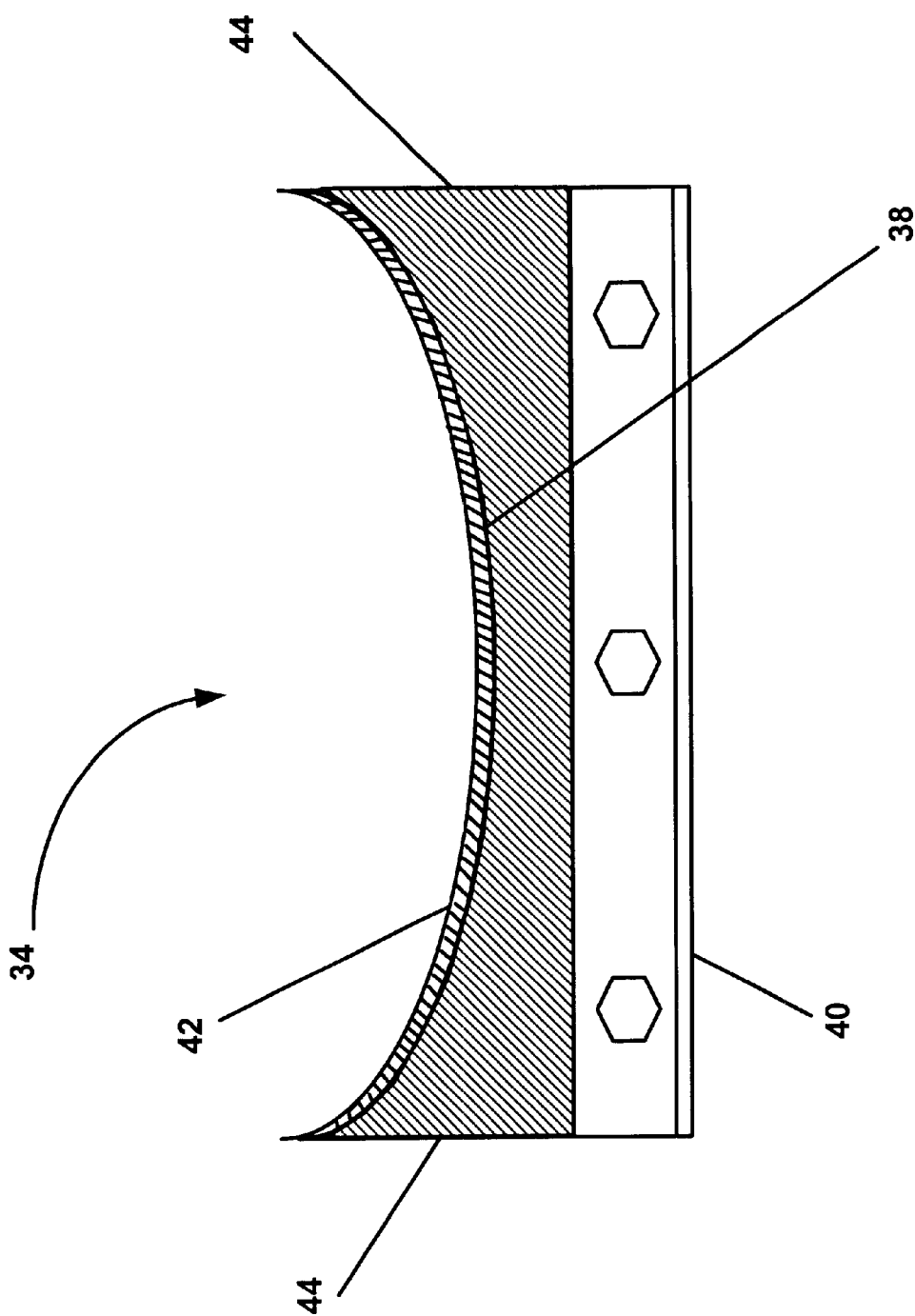
FIG. 3 is a cross sectional view of an embodiment of the cradle assembly.
Figure 5:
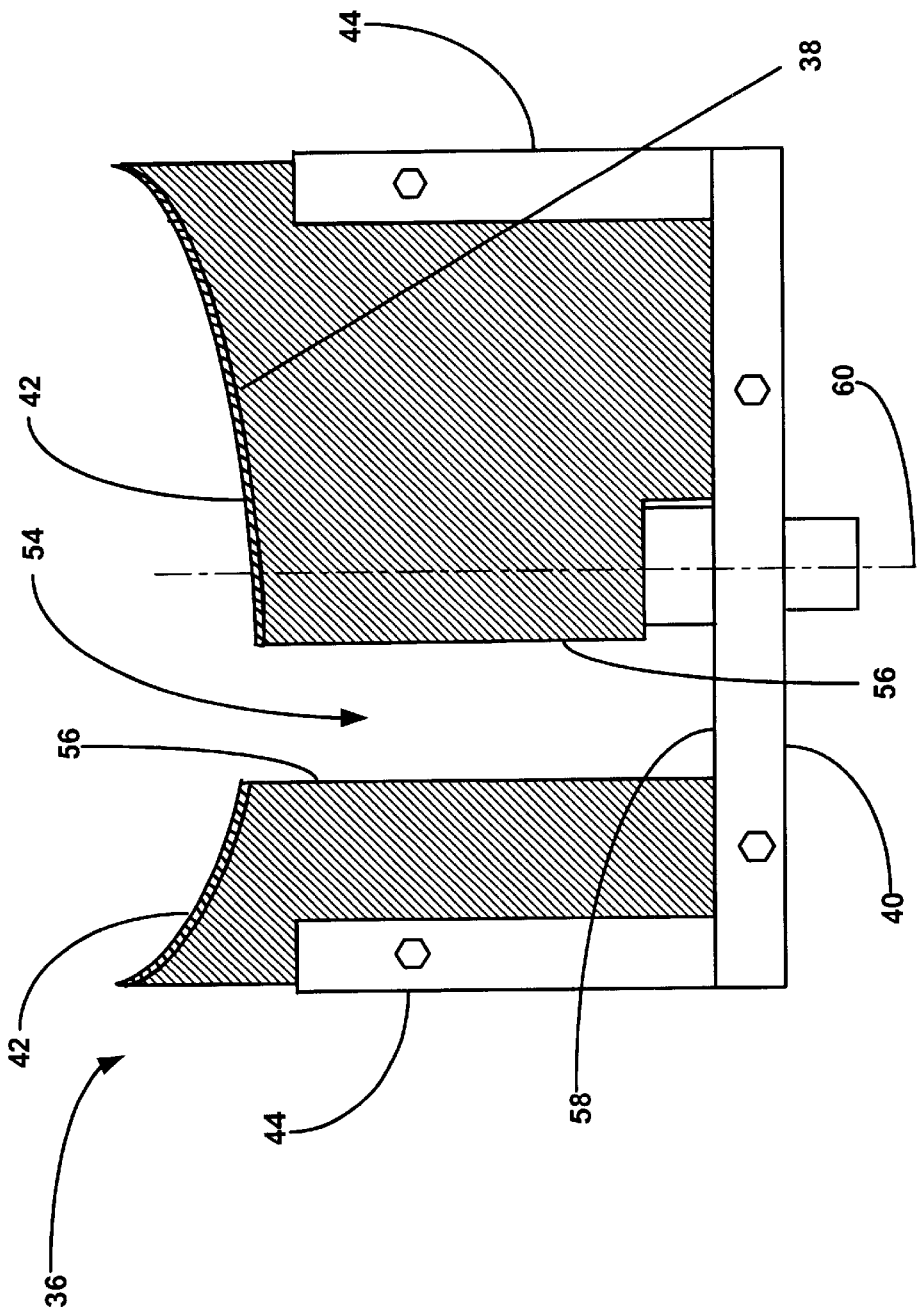
FIG. 5 is a cross sectional view of another embodiment of the cradle assembly.

The first cradle assembly 34 and second cradle assembly 36 each form a bed, a frame, a docklike structure, a support, or the like for the aircraft engine 9 to rest. In the preferred embodiment, as seen in FIG. 1, the first cradle assembly 34 supports an aircraft engine 9 at one specific location, while the second cradle assembly 36 supports that same aircraft engine 9 at a second specific location. As seen in FIGS. 3 and 5, the first cradle assembly 34 and second cradle assembly 36 have a cradle top portion 38 and a cradle bottom portion 40. The cradle top portion 38 is contoured to the shape of the underbelly 11 of the particular aircraft engine 9 of the aircraft that a spar, spar cap or wing is being replaced or repaired. An underbelly 11 of an aircraft engine 9 is typically defined, but without limitation, as the lower, underside portion of an aircraft engine 9. For instance, if the aircraft is a P-3, then the cradle top portion 38 is contoured to conform to a P-3 engine at the respective engine location that rests on the cradle top portion 38. Typically the cradle top portion 38 of the first cradle assembly 34 and the second cradle assembly 36 is curved or contoured as a portion of a circle or arc. A cushioning device 42 may be disposed on the cradle top portion 38. The cushioning device 42 may be in the form of a mat or protective covering. The cushioning device 42 may be rubber, felt, textile material, an inflatable support, plastic, gel, or any type of device, system, apparatus or material that will provide support and prevent scratching or damage to the aircraft engine 9 or the cradle assembly 34, 36. The preferred cushioning device 42 is quarter inch thick felt. Felt is typically, but without limitation, any matted fabric or material, or more specifically, a nonwoven fabric of wool, fur or hair matted together by heat, moisture, and great pressure.

Figure 4:
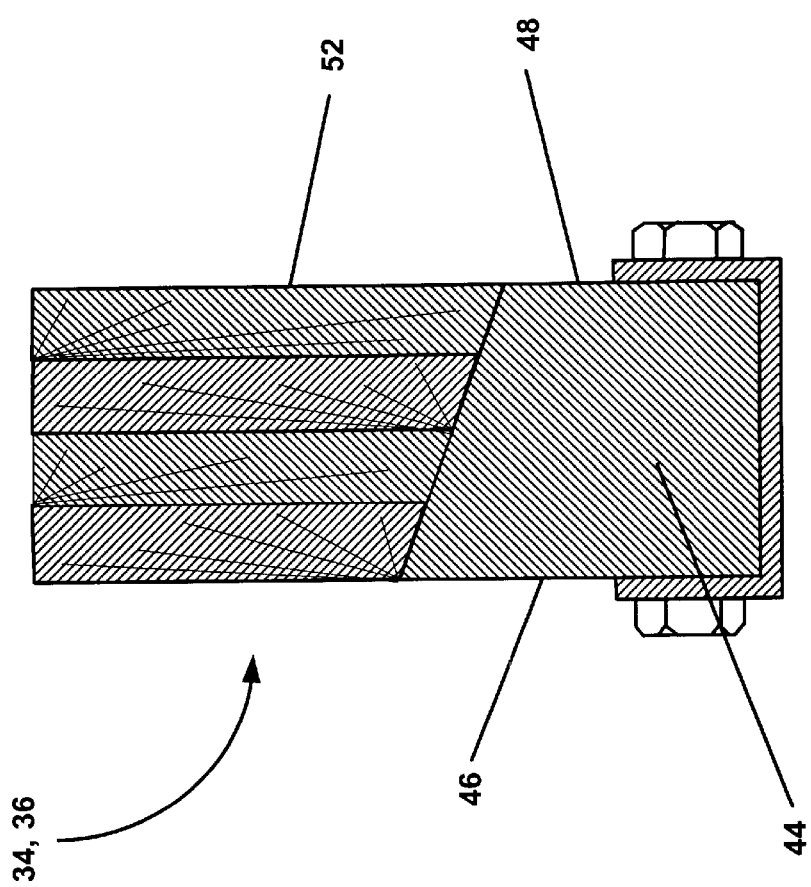
FIG. 4 is side view of the cradle assembly.

The first cradle assembly 34 and second cradle assembly 36 each have two side cradle portions 44, a front cradle portion 46 and a rear cradle portion 48. In operation, the front cradle portion 46 is typically closer to the front of the aircraft, while the rear cradle portion 48 is typically closer to the rear of the aircraft. As shown in FIG. 4, the top of the two side cradle portions 44 can be sloped downward from the front cradle portion 46 to the rear cradle portion 48. The preferred downward angle is approximately 10 degrees from the x-axis (horizontal axis) in a typical geometric configuration.

The first cradle assembly 34 and second cradle assembly 36 each may also include an attachment tubing 50, which attaches the cradle assembly 34, 36 to the shoring shaft portion 28. The attachment tubing 50 may be a steel tubing centered under the cradle assembly 34, 36. The attachment-tubing 50 may be attached to the cradle assembly 34, 36 and shoring shaft portion 28 by any type of fastener (any mechanical, electrical, chemical agent for joining two or more parts or components.)

As shown in FIG. 4, the first cradle assembly 34 and second cradle assembly 36 may also each contain two cradle assembly side supports 52 that may be disposed at the two side cradle portions 44. In the preferred embodiment, the two cradle assembly side supports 52 are manufactured from laminated plywood.

In one of the embodiments of the aircraft load cell shoring 1, both the first cradle assembly 34 and second cradle assembly 36 are substantially similar, both being similar to the cradle assembly depicted in FIG. 3. In the preferred embodiment, the first cradle assembly 34 is as described above, while the second cradle assembly 36 has a cradle cut out 54. As seen in FIG. 5, a cradle cut out 54 is a long narrow cut, fossa, groove, channel, flute, or strait cut from a section of the second cradle assembly 36. The cradle cut out 54 passes from the front cradle portion 46 to the rear cradle portion 48, and cuts through the cradle top portion 38 of the second cradle assembly 36 but stops prior to reaching the cradle bottom portion 40 of the second cradle assembly 36. The two side cradle portions 44 are fully intact and the cradle cut out 54 is disposed between the two side cradle portions 44. As seen in FIG. 5, the cradle cut out 54 may have two cradle cut out sides 56 and a cradle cut out bottom 58. The two cradle cut out sides 56 may be parallel to each other and perpendicular to the cradle cut out bottom 58. In the preferred embodiment the entire cradle cut out 54 is entirely disposed on the port side (left side of an aircraft looking forward from rear) of the centerline 60 of the second cradle assembly 36.

The load cell adapter 10 may attach the shoring shaft portion 28 to the load cell 5. The load cell adapter 10 may be a threaded shaft, rod, tubing, cylinder, wand, stem, slender bar, pole, relatively long, straight, rigid piece of material, arm, beam, member, cantilever, arbor, or the like. As seen in FIG. 6, the load cell adapter may include a threaded shaft 62, a cylindrical portion 64 and a beveled portion 66. The threaded shaft 62, the cylindrical portion 64 and the beveled portion 66 may be substantially cylindrical in shape and axially aligned. To be axially aligned the axes of the objects are aligned such that it appears that all the axes continue as one substantially straight axis. The cylindrical portion 64 may communicate with or be attached to the fixed receptacle 26, while the threaded shaft 62 may communicate with or be attached to the load cell 5. The load cell adapter 10 may be any apparatus, device or system which connects the load cell 5 to the shoring contour assembly 20 and allows the shoring contour assembly 20 to be used at an oblique, non-zero, non-perpendicular angle from the main axis of the airplane jack 7. The main axis of the airplane jack 7 is typically perpendicular to the x-axis (the horizontal axis) or parallel to the y-axis (the vertical axis) in a standard geometric configuration.

The shoring shaft portion 28 may be at an angle to the x-axis (the horizontal) of a typical geometric configuration. This angle is typically different for different aircraft as well as different engines on the same aircraft. For instance, the preferred angle for a P-3 airplane inboard engine is about 22.7 degrees relative to the x-axis, with the first shaft end 30 being positionally higher than the second shaft end 32 (appearing as a downward slope from the first shaft end 30 to the second shaft end 32.) The preferred angle for a P-3 airplane outboard engine is 13.3 degrees relative to the x-axis. An inboard engine is an engine on an airplane having at least four engines, and is located on either side of and next to the fuselage. An outboard engine is an engine that is farthest from the fuselage or hull.

Although the present invention has been described in considerable detail with reference to certain preferred versions thereof, other versions are possible. Therefore, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. 112 paragraph 6. In particular, the use of "step of" in the claims herein is not intended to invoke the provisions of 34 U.S.C. 112 paragraph 6.

What is claimed is:

1. An aircraft load cell shoring for placing a wing in an unloaded condition, an aircraft engine being attached to said wing, the aircraft load cell shoring for use with a load cell, said load cell mounted on an aircraft jack, the aircraft load cell shoring comprising of:
   (a) a load cell adapter, the load cell adapter being able to be disposed above and attachable to said load cell; and
   (b) a shoring contour assembly for supporting said aircraft engine at two specific locations, the shoring contour assembly having a shoring contour assembly bottom portion, the shoring contour assembly having a fixed receptacle located at the shoring contour assembly bottom portion, the load cell adapter communicating with the fixed receptacle, said aircraft engine and enclosed part of said wing having a center of gravity, the fixed receptacle being located such that said aircraft jack is aligned with the center of gravity of said aircraft engine and enclosed part of said wing.

2. The aircraft load cell shoring of claim 1, wherein the shoring contour assembly further having a first cradle assembly for supporting said aircraft engine at a first location and a second cradle assembly for supporting said aircraft engine at a second location.

3. The aircraft load cell shoring of claim 2, wherein the shoring contour assembly having a shoring shaft portion wherein the first cradle assembly and the second cradle assembly being located at opposite ends of the shoring shaft portion.

4. The aircraft load cell shoring of claim 3, wherein the first cradle assembly includes a first cradle top portion and the second cradle assembly includes a second cradle top portion, said aircraft engine having an aircraft engine underbelly, the first cradle top portion and the second cradle top portion both being contoured to accept said aircraft engine underbelly.

5. The aircraft load cell shoring of claim 4, wherein the first cradle assembly top portion and the second cradle assembly top portion each further include a cushioning devise, the cushioning devise being a material selected from the group of rubber, felt, textile material, plastic, gel, and an inflatable support.

6. An aircraft load cell shoring for placing a wing in an unloaded condition, an aircraft engine being attached to said wing, the aircraft load cell shoring for use with a load cell, said load cell mounted on an aircraft jack, the aircraft load cell shoring comprising of:
   (a.) a load cell adapter, the load cell adapter being able to be disposed above and attachable to said load cell; and
   (b) a shoring contour assembly for supporting said aircraft engine at two specific locations, the shoring contour assembly having a shoring contour assembly bottom portion, a first cradle assembly for supporting said aircraft engine at a first location, a second cradle assembly for supporting said aircraft engine at a second location, a shoring shaft portion wherein the first cradle assembly and the second cradle assembly being located at opposite ends of the shoring shaft portion, the second cradle assembly having a cradle cut out, the shoring contour assembly having a fixed receptacle located at the shoring contour assembly bottom portion, the load cell adapter communicating with the fixed receptacle, said aircraft engine and enclosed part of the wing having a center of gravity, the fixed receptacle being located such that said aircraft jack is aligned with the center of gravity of said aircraft engine and enclosed part of said wing.

7. The aircraft load cell shoring of claim 6, wherein the second cradle assembly further having a centerline and a port side, the cradle cut out being entirely disposed on the port side of the centerline of the second cradle assembly.

8. The aircraft load cell shoring of claim 7, wherein the first cradle assembly and the second cradle assembly each further include an attachment tubing, the attachment tubing attaches the first cradle assembly and the second cradle assembly to the shoring shaft portion.

9. The aircraft load cell shoring of claim 8, wherein the first cradle assembly and the second cradle assembly each include a front cradle portion and a rear cradle portion, two side cradle portions, the two side cradle portions having a top, the top of the two side portions sloping downward from the front cradle portion to the rear cradle portion.

10. The aircraft load cell shoring of claim 9, wherein the downward angle of the two side cradle portions is about 10 degrees.

11. The aircraft load cell shoring of claim 10, wherein the first cradle assembly and the second cradle assembly each include two cradle assembly side supports, the cradle assembly side supports being disposed at the side cradle portions.

12. The aircraft load cell shoring of claim 11, wherein the cradle assembly side supports are manufactured from laminated plywood.

13. The aircraft load cell shoring of claim 12, wherein the load cell adapter includes a threaded shaft, a cylindrical portion and a beveled portion, the threaded shaft communicates with said load cell and the cylindrical portion communicates with the fixed receptacle.

14. The aircraft load cell shoring of claim 13, wherein the first cradle assembly top portion and the second cradle assembly top portion each further include a cushioning devise, the cushioning devise being a material selected from the group of rubber, felt, textile material, plastic, gel, and an inflatable support.

* * * * *